(12) United States Patent
Wilson

(10) Patent No.: US 6,701,969 B2
(45) Date of Patent: Mar. 9, 2004

(54) FLEXIBLE TUBULAR PIPE AND METHOD OF MANUFACTURING SAME

(75) Inventor: Brian Scott Wilson, Panama City, FL (US)

(73) Assignee: Wellstream International Limited (GB)

( * ) Notice: Subject to any disclaimer, the term of this patent is extended or adjusted under 35 U.S.C. 154(b) by 0 days.

(21) Appl. No.: 10/279,047

(22) Filed: Oct. 23, 2002

(65) Prior Publication Data

US 2003/0079791 A1 May 1, 2003

Related U.S. Application Data

(60) Provisional application No. 60/335,518, filed on Oct. 31, 2001.

(51) Int. Cl.[7] .............................................. F16L 11/10
(52) U.S. Cl. .................. 138/137; 138/134; 138/135; 138/140
(58) Field of Search ............................... 138/137, 140, 138/129, 134, 135

(56) References Cited

U.S. PATENT DOCUMENTS

| 4,867,205 | A | * | 9/1989 | Bournazel et al. .......... 138/130 |
| 4,903,735 | A | | 2/1990 | Delacour et al. |
| 5,406,984 | A | * | 4/1995 | Sugier et al. ................ 138/135 |
| 5,601,893 | A | | 2/1997 | Strassel et al. |
| 5,647,400 | A | | 7/1997 | Jani et al. |
| 5,730,188 | A | | 3/1998 | Kalman et al. .............. 138/135 |
| 6,039,083 | A | | 3/2000 | Loper |
| 6,053,213 | A | * | 4/2000 | Jung et al. .................. 138/130 |
| 6,085,798 | A | * | 7/2000 | Le Nouveau ................ 138/125 |
| 6,123,114 | A | * | 9/2000 | Seguin et al. ................ 138/124 |
| 6,363,974 | B1 | * | 4/2002 | Perez et al. .................. 138/130 |

FOREIGN PATENT DOCUMENTS

WO    WO 01/33129 A1    5/2001

* cited by examiner

*Primary Examiner*—Patrick Brinson
(74) *Attorney, Agent, or Firm*—Haynes and Boone, LLP.

(57) ABSTRACT

A flexible pipe and a method of manufacturing same according to which an inner sheath is surrounded by at least one tensile layer, and an outer sheath of polymeric material consisting of an olefin polymer blended with at least one thermoset elastomer is disposed around the tensile layer.

27 Claims, 1 Drawing Sheet

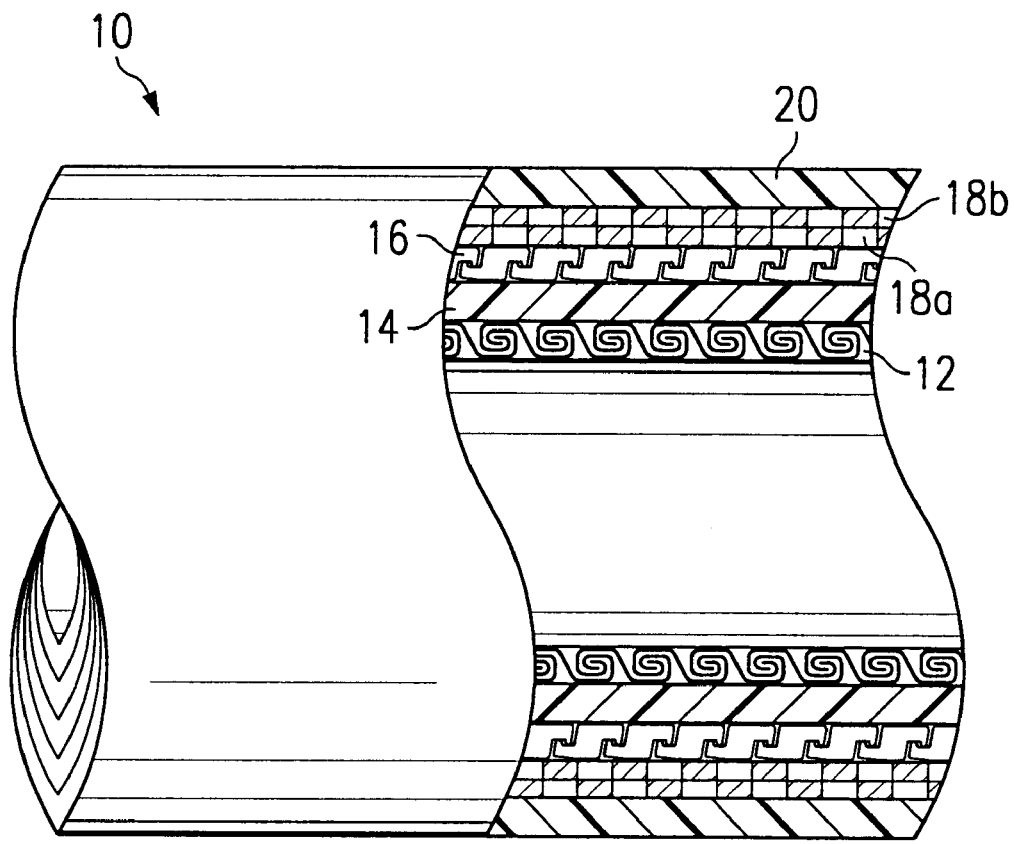

FLEXIBLE TUBULAR PIPE AND METHOD OF MANUFACTURING SAME

CROSS-REFERENCE

This application relates to, and claims priority of, provisional application No. 60/335,518, filed Oct. 31, 2001.

BACKGROUND

Flexible tubular pipes for transporting fluids usually associated with the oil and gas industry have been used for many years. Bonded flexible pipes of these types have traditionally employed an external sheath formed by thermoset elastomers, polyethylene, or nylon.

However, although these materials provide excellent flexibility, they have disadvantages. For example the thermoset elastomers have higher production cost and production of long lengths is more difficult. Also, the polyethylene sheaths becomes stiff at low temperature, have limited fatigue resistance, and a relatively high thermal conductivity. Moreover, nylon becomes stiff and tends to be brittle at arctic temperatures and, in addition, is susceptible to degradation in the presence of moisture at elevated temperatures and therefore must be dried thoroughly prior to extrusion processing.

In view of the above there is a trend towards forming the outer sheaths of flexible pipes with a polymeric material that has resistance to fatigue in dynamic situations. For example, certain grades of polyamide 11 are routinely used (such as products sold by Atofina under the trade name RILSAN). Although this material gives excellent results, it is a high cost material and cannot be used in some cases because of its limited resistance to high temperatures and its sensitivity to the presence of water.

Therefore there is a need for a flexible tubular pipe having an impervious outer sheath that eliminates the above disadvantages.

BRIEF DESCRIPTION OF THE DRAWING

The drawing is a cross-sectional view of an embodiment of a flexible pipe according to an embodiment of the present invention.

DETAILED DESCRIPTION

A flexible tubular pipe according to an embodiment of the present is referred to, in general, by the reference numeral 10. The pipe is formed by an inner flexible tube 12 consisting of helical wound flat or profiled strips to provide collapse resistance. An essentially impervious polymeric sheath 14 is provided around the tube 12 for containing the fluid in the pipe. A layer 16 is wrapped, or otherwise formed, around the layer 14 and provides resistance to internal pressure, hydrostatic collapse and crush. The layer 16 can be formed by helically wrapping a continuous strip, preferably formed of carbon steel, with adjacent windings being interlocked, to form a flexible layer that provides significant hoop and axial strength. An example of the layer 16 is marketed by the assignee of the present invention, Wellstream, Inc., under the "FLEXLOK" trademark.

An inner tensile layer 18a is wrapped around the layer 16, and an outer tensile layer 18b is wrapped around the layer 18a. Each layer 18a and 18b consists of at least one tensile reinforcement element that is wound to resist the hoop stress, the axial component of the internal pressure, and the axial load due to the weight of the suspended pipe and exterior effects.

Although not shown in the drawings, it is understood that a layer of tape (not shown) may be provided between the outer surface of the layer 16 and the inner surface of the layer 18a, and between the layers 18a and 18b.

An outer polymeric sheath 20 is formed over the outer tensile layer 18b and is fabricated from a polymeric material consisting of an olefin polymer blended with at least one thermoset elastomer. The thermoplastic polymer can be crystalliane and can be a polyolefin, or polyolefin blended, thermoplastic polymer crosslinked and having a crystalinity close to that corresponding to the non-crosslinked state, the crosslinking being operative in the amorphous phase. Alternatively, the thermoplastic polymer is crosslinked and has a crystalinity lower than that of the non-crosslinked state.

The above-mentioned polymer material of the sheath 20 provides low temperature flexibility, improved thermal insulation characteristics, lighter weight and resistance to degradation. Also, it has a very good resistance to chemical elements and fatigue when in contact with drilling fluids and seawater. Further, the manufacturing process is simplified due to the material's improved processability. Moreover, the thermoplastic elastomer of the sheath 20 exhibits good fatigue properties, low environmental stress-cracking resistance, and good temperature resistance.

It is also understood that a layer of tape (not shown) may be provided between the outer surface of the layer 18b and the inner surface of the sheath 20.

As a result of the foregoing the pipe 10 possesses unique and desirable properties not previously found in flexible pipes of the above type.

Variations and Equivalents

It is understood that the tube 12 and/or the layer 16 may be omitted from the embodiment discussed above. Also, materials for the layers 18a and 18b can be varied, and do not necessarily have to be metallic. Further, the pipe 10 may include one or more intermediate polymeric sheaths and/or helically wound plastics material layers. Still further, the blended polymeric material of the sheath 20 can be used in the other layers, such as sheath 14, or additional layers such as a sealing layer that would extend over the layer 16.

It is understood that spatial references, such as "outer", "over", "between", "inner", and "surrounding" are for the purpose of illustration only and do not limit the specific orientation or location of the layers described above.

Since other modifications, changes, and substitutions are intended in the foregoing disclosure, it is appropriate that the appended claims be construed broadly and in a manner consistent with the scope of the invention.

What is claimed is:

1. A pipe comprising:
   an inner tubular sheath,
   at least one tensile layer extending around the sheath, and
   an outer sheath formed by polymeric material consisting of an olefin polymer blended with at least one thermoset elastomer.

2. The pipe of claim 1 wherein the polymeric material is a crosslinked thermoplastic polymer having a crystalinity substantially equal to that corresponding to the non-crosslinked state.

3. The pipe of claim 1 wherein the polymeric material is selected from the group consisting of a crystalliane, a polyolefin, and a polyolefin blended, thermoplastic polymer.

4. The pipe of claim 3 wherein the thermoplastic polymer is crosslinked and has a crystalinity substantially equal to that corresponding to the non-crosslinked state.

5. The pipe of claim 3 wherein the thermoplastic polymer is crosslinked and has a crystalinity lower than that of the non-crosslinked state.

6. The pipe of claim 1 further comprising an inner flexible tube extending within the inner sheath.

7. The pipe of claim 6 wherein the inner flexible tube consists of helical wound flat or profiled strips.

8. The pipe of claim 1 further comprising an additional layer wrapped around the inner sheath and constructed to provide resistance to internal pressure, hydrostatic collapse and crush.

9. The pipe of claim 8 wherein the additional layer is formed by helically wrapping a continuous strip, preferably formed of carbon steel, with interlocked adjacent windings.

10. The pipe of claim 8 wherein the tensile layer comprises an inner tensile layer wrapped around the additional layer, and an outer tensile layer wrapped around the inner tensile layer.

11. The pipe of claim 1 wherein the inner sheath is formed of a polymeric material.

12. The pipe of claim 1 further comprising a layer of tape provided between the outer surface of the inner sheath and the inner surface of the tensile layer.

13. The pipe of claim 1 further comprising a layer of tape provided between the outer surface of the tensile layer and the inner surface of the outer sheath.

14. The pipe of claim 1 wherein the tensile layer comprises an inner tensile layer extending around the inner sheath, and an outer tensile layer extending around the inner tensile layer, and further comprising a layer of tape extending between the tensile layers.

15. A method of manufacturing a method comprising:

surrounding an inner sheath with at least one tensile layer;

forming an outer sheath of polymeric material consisting of an olefin polymer blended with at least one thermoset elastomer; and disposing the outer sheath around the tensile layer.

16. The method of claim 15 wherein the polymeric material is a crosslinked thermoplastic polymer having a crystalinity substantially equal to that corresponding to the non-crosslinked state.

17. The method of claim 15 wherein the polymeric material is selected from the group consisting of a crystalliane, a polyolefin, and a polyolefin blended, thermoplastic polymer.

18. The method of claim 17 wherein the thermoplastic polymer is crosslinked and has a crystalinity substantially equal to that corresponding to the non-crosslinked state.

19. The method of claim 17 wherein the thermoplastic polymer is crosslinked and has a crystalinity lower than that of the non-crosslinked state.

20. The method of claim 15 further comprising fabricating an inner flexible tube of by of helical wound flat or profiled strips, and disposing the inner flexible tube within the inner sheath.

21. The method of claim 15 further comprising forming an additional layer by helically wrapping a continuous strip, preferably formed of carbon steel, with interlocked adjacent windings; and wrapping the additional layer around the inner sheath.

22. The method of claim 15 further comprising forming an additional layer to provide resistance to internal pressure, hydrostatic collapse, and crush; and wrapping the additional layer around the inner sheath.

23. The method of claim 22 wherein the tensile layer is wrapped around the additional layer, and further comprising wrapping another tensile layer around the inner tensile layer.

24. The method of claim 15 further comprising forming the inner sheath of a polymeric material.

25. The method of claim 15 further comprising wrapping a layer of tape between the outer surface of the inner sheath and the inner surface of the tensile layer.

26. The method of claim 15 further comprising wrapping a layer of tape between the outer surface of the tensile layer and the inner surface of the outer sheath.

27. The method of claim 15 wherein the tensile layer is formed by an inner portion extending around the inner sheath, and an outer portion extending around the inner portion, and further comprising wrapping a layer of tape extending between the tensile layers.

* * * * *